(12) United States Patent
Jury et al.

(10) Patent No.: US 6,262,175 B1
(45) Date of Patent: Jul. 17, 2001

(54) THERMOPLASTIC ELASTOMER COMPOSITION

(75) Inventors: James R. Jury, Brampton; Alfred Wing Yan Chien, Richmond Hill, both of (CA)

(73) Assignee: NRI Technology Inc., Toronto (CA)

( * ) Notice: Subject to any disclaimer, the term of this patent is extended or adjusted under 35 U.S.C. 154(b) by 0 days.

(21) Appl. No.: 09/070,728

(22) Filed: May 1, 1998

(30) Foreign Application Priority Data

May 1, 1997 (CA) ................................................. 2204229
May 16, 1997 (CA) ................................................. 2205741

(51) Int. Cl.$^7$ ............................... C08L 9/00; C08L 9/02; C08L 19/00
(52) U.S. Cl. ................................. 525/93; 525/94; 525/95; 525/97; 525/98; 525/99; 525/185; 525/190; 525/228; 525/229; 525/237; 525/240; 525/241
(58) Field of Search ................................. 525/93, 94, 95, 525/97, 98, 99, 185, 190, 228, 229, 237, 240, 241

(56) References Cited

U.S. PATENT DOCUMENTS

| | | | |
|---|---|---|---|
| Re. 35,398 | 12/1996 | Hazelton et al. | 524/425 |
| 3,896,059 | 7/1975 | Wakefield et al. | |
| 4,013,616 | 3/1977 | Wallace. | |
| 4,386,182 | 5/1983 | Zijp | 524/375 |
| 4,409,365 | 10/1983 | Coran et al. | 525/78 |
| 4,713,419 | 12/1987 | Takimoto et al. | 525/211 |
| 4,771,110 | 9/1988 | Bauman et al. | 525/131 |
| 5,010,122 | 4/1991 | Koski | 524/80 |
| 5,051,478 | 9/1991 | Puydak et al. | 525/195 |
| 5,157,082 | 10/1992 | Johnson | 525/237 |
| 5,356,939 | 10/1994 | Burrowes et al. | 521/41.5 |
| 5,397,825 | 3/1995 | Segrest | 524/270 |
| 5,506,274 | 4/1996 | Brown | 521/41 |
| 5,510,419 | 4/1996 | Burgoyne et al. | 525/98 |
| 5,514,721 | 5/1996 | Hart | 521/41 |
| 5,523,328 | 6/1996 | Rosenbaum et al. | 521/41 |

FOREIGN PATENT DOCUMENTS 1382749   2/1975   (GB).

Primary Examiner—Jeffrey Mullis
(74) Attorney, Agent, or Firm—Ridout & Maybee

(57) ABSTRACT

A thermoplastic elastomer composition containing in percentages by weight based on the total weight of the composition, about 5% to about 90% vulcanized rubber crumb; about 5% to about 60% polyolefin; about 2% to about 30% uncured rubber or styrene-based thermoplastic elastomer; and about 2% to about 30% vinyl polymer selected from vinyl homopolymers, copolymers and mixtures. The composition in total contains less than 15% styrene block copolymer.

20 Claims, No Drawings

THERMOPLASTIC ELASTOMER COMPOSITION

The present invention relates to a thermoplastic elastomer composition containing substantial quantities of vulcanized rubber crumb and polyolefin. The vulcanized crumb may be, but is not necessarily, derived from scrap tires, and in such case may typically consist primarily of styrene-butadiene rubber, but in such admixtures with natural rubber, and other types of synthetic rubbers as may from time to time be used by the tire producers in their compound recipes.

Applicant is aware of various prior proposals for such compositions, for example in U.S. Pat. No. 5,514,721 (Hart). However, compositions disclosed in Hart have a high content of relatively expensive styrene block copolymer, greater than about 25%, for example.

Other prior-proposed compositions of which the applicant is aware have had relatively poor physical properties. For example, U.S. Pat. No. 5,157,082 (Johnson) discloses compositions comprising ground vulcanized rubber, polyolefin and a functionalized olefin polymer. Compositions of this type, however, tend to have relatively low ultimate elongation and tear strength.

Applicant has found that thermoplastic elastomer compositions having excellent physical properties, including excellent ultimate elongation and tear strength can be obtained by blending vulcanized rubber crumb and polyolefin together with uncured rubber or styrene-based thermoplastic rubber and vinyl based polymer. The uncured rubber or curable thermoplastic rubber and vinyl based polymer together constitute a two stage compatibilizing system which provides superior physical properties over known compositions.

In accordance with the present invention there is provided a thermoplastic elastomer composition comprising a blend of the following components:

(a) about 5% to about 90% vulcanized rubber crumb;

(b) about 5% to about 60% polyolefin;

(c) about 2% to about 30% uncured rubber or styrene-based thermoplastic elastomer; and (d) about 2% to about 30% vinyl polymer selected from the group consisting of vinyl homopolymers, copolymers and mixtures thereof;

and with the proviso that when said component (c) or (d) comprises styrene block copolymer said composition contains in total less than 15% styrene block copolymer.

Unless otherwise indicated, all percentages herein are by weight based on the total weight of the composition.

Without wishing to be bound by any theory, it is believed that the uncured rubber or styrene-based thermoplastic rubber component (c) of the composition imparts excellent strength properties to the composition as a result of the entanglement of the molecular chains constituting the rubber polymer molecule. These molecular chains are believed to form interpenetrating random coils, and it is believed that this molecular structure is capable of imparting excellent strength properties.

Further, it is believed the vinyl polymer portion (d) serves to provide adhesion to the tire crumb at the molecular level, and that the excellent physical properties result from improved adhesion or bonding between the tire crumb and the remaining components of the composition.

In one especially preferred form of the present invention, the vinyl polymer comprises polymer chains having pendant oxygen-containing groups. These compositions provide exceptionally good ultimately elongation values and tear strengths. The rubber molecules in the tire crumb tend to have polar sites as a result of the chemical composition of the rubber and minor oxidation occurring during mechanical comminution. Without wishing to be bound by any theory, it is believed that the polymers having pendant oxygen-containing groups provide improved adhesion to the rubber crumb as a result of the affinity with these polar sites on the rubber crumb.

The vulcanized rubber crumb used in the present composition may be obtained by grinding or otherwise comminuting any source of vulcanized rubber compound, such as road vehicle tires, roofing membrane, hoses, gaskets and the like, and is preferably obtained from recycled passenger car tires using any conventional procedure. Any steel or other metallic inclusions should be removed from the ground tires before use in the compositions of the invention. Since the compositions of the invention are preferably fiber-free, all fibrous material such as tire cord fibers is preferably likewise removed from the ground rubber using conventional separation procedures before use in the compositions of the invention. Desirably, the vulcanized rubber crumb is of a particle size in the range about 20 to about 100 mesh (Tyler standard sieve). The use of rubber crumb of a particle size substantially coarser than about 20 mesh tends to result in molded products which are insufficiently homogeneous and tend to have relatively poor strength properties. The use of crumb which is substantially finer than about 100 mesh tends to significantly increase the energy costs of the comminution operation, without significant improvement of the properties of the compositions. As noted above, desirably the compositions of the invention comprise about 5 to about 90 weight percent of the vulcanized rubber crumb. Compositions comprising greater than about 90% by weight of the cured rubber crumb can exhibit processing problems and tend to have poor strength properties, while compositions containing less than about 5% of the rubber crumb tend to be excessively costly, as a result of their low content of the relatively low cost cured rubber crumb material. Preferably, the composition comprises about 25 to about 75% by weight of the rubber crumb, more preferably about 40 to about 60%.

The polyolefin component (b) may comprise any solid high molecular weight polyolefin homopolymer or copolymer, or mixtures thereof. Examples of olefin polymers suitable for use in the present compositions include homopolymers or copolymers of ethylene, propylene, 1-butene, 1-pentene, 3-methyl-1-butene, 4-methyl-1-pentene, 3,3-dimethyl-1-butene, 5-methyl-1-hexane and mixtures thereof. Preferably, the polyolefin comprises polyethylene, polypropylene or a copolymer of ethylene and propylene.

Preferably, as noted above, the compositions of the invention comprise about 5% to about 60% by weight of the polyolefin homopolymer, copolymer or mixtures thereof. Compositions having a polyolefin content of greater than about 60% may tend to be excessively stiff and to exhibit poor elongation values, while polyolefin contents of less than about 5% by weight tend to result in the composition may exhibit processing problems and tend to have relatively poor strength properties. More preferably, the composition comprises about 10 to about 40% by weight of polyolefin, still more preferably about 20 to about 30% by weight of the total composition. Preferably, the composition comprises polyethylene and polypropylene in a weight ratio of about 1.5 to 3 parts by weight polyethylene per part by weight of polypropylene, more preferably about 1.8 to about 2.8 parts by weight polyethylene per part polypropylene.

The uncured rubber or styrene-based or styrenic thermoplastic rubber component of the present composition is considered to provide adhesion or bonding between the remaining components of the composition and the vulcanized rubber crumb component and to provide elasticity for the composition.

Compositions that contain less than about 2% by weight uncured rubber or styrene-based thermoplastic elastomer tend to be excessively stiff, while compositions containing greater than about 30% by weight of uncured rubber or styrene-based thermoplastic elastomer may tend to be excessively soft and have insufficient strength properties. Preferably, the composition comprises about 4 to about 20 weight percent of uncured rubber or styrene-based elastomer, more preferably about 5 to about 15% uncured rubber or styrene-based thermoplastic elastomer, based on the total weight of the composition.

The term "rubber" as used herein is to be interpreted as it would be understood by those skilled in the art, to mean natural rubber and all natural or synthetic polymers having mechanical properties similar to the properties characteristic of natural rubber, namely deformability, rapid recovery from deformation, and mechanical strength. Examples of such materials include natural rubber, styrene-butadiene rubber, polybutadiene, polyisoprene, polyisobutylene, isoprene-butadiene copolymer, neoprene, nitrile rubber, butyl rubber, polysulfide elastomers, acrylic elastomers, silicone rubbers, polyester rubbers, diisocyanate-linked condensation elastomers, EPDM (ethylene-propylene diene rubbers), EPT (ethylene-propylene terpolymer rubbers), and mixtures thereof. All such rubber materials in uncured, or curable, form are contemplated for use in the compositions of the invention. That is to say, the term "uncured" as used in the present specification is to be understood broadly as it would be understood by those skilled in the art to refer to materials capable of undergoing vulcanization or crosslinking. It does not exclude a certain degree of vulcanization or crosslinking present in the starting material. The degree of curing or crosslinking of a particular rubber material may be determined by standard tests well known to those skilled in the art. For example, conventionally the degree of cure or vulcanization of a natural rubber or styrene-butadiene rubber compound in determined by comparing its tensile strength before and after undergoing further curing under standard conditions. A material which undergoes no increase in tensile strength is 100% cured, while increases in tensile strength indicate various degrees of lack of cure.

In the preferred form, component (c) comprises a styrene block copolymer which may be a curable thermoplastic elastomer. Preferred examples of styrene block copolymers have styrene polymer blocks at each end and an intermediate block comprising a rubber polymer or copolymer, for example an amorphous or random, rubbery homo-polymer or copolymer. For example, such block copolymers may be styrene-butadiene-styrene, styrene(ethylene/butylene random copolymer)-styrene, styrene(ethylene/propylene random copolymer)-styrene, styrene-isoprene-styrene, and mixtures of two or more of these. The styrene block copolymers appear to provide tensile strength in the composition as a result of entanglement of the end portions of the polymer molecule. Further, the styrenic end portions appear to blend or bond with the vulcanized rubber material as a result of the affinity between the styrenic end portions and uncured domains in the tire crumb. Especially presently preferred are styrene-butadiene-styrene block copolymers. The presently preferred compositions of the invention contain in total about 2 to about 14%, more preferably about 6 to about 12% styrene block copolymer.

As indicated above, the compositions of the invention comprise about 2 to about 30% vinyl polymer by weight. Said vinyl polymer may comprise vinyl homopolymers, copolymers or mixtures thereof.

Compositions that contain less than about 2% by weight of the vinyl polymer may tend to be excessively stiff, while compositions containing greater than about 30% by weight of the vinyl polymer material may tend to be excessively soft and have insufficient strength properties. Preferably, the composition comprises about 4 to about 20 weight percent of the vinyl polymer, and more preferably about 5 to about 15% polymer, based on the total weight of the composition. The term "vinyl polymers" and "vinyl copolymers" are used in the sense in which they would be understood by those skilled in the art to refer to thermoplastic polymers or copolymers made from vinyl monomers, $CH_2=CHX$ and vinylidene monomer, $CH_2=CY_2$, but excluding poly($\alpha$-olefins) wherein X is an aliphatic hydrocarbon group and thermosetting resins made in part from vinyl monomers, such as polyester resins. In the present compositions, the vinyl polymers facilitate bonding between the vulcanized rubber crumb molecules, the uncured rubber or curable thermoplastic elastomer component, and the thermoplastic component, and provide increased elasticity. Examples of suitable vinyl polymers include polystyrene, copolymers of styrene with other vinyl monomers, polymers of derivatives of styrene, polyvinyl chloride and polyacrylonitrile. Especially preferred are vinyl polymers that have pendant groups on the polymeric chain that comprise oxygen atoms. Examples of such polymers include polyvinylacetate, polybutylacrylate, polymethylacrylate, polymethylmethacrylate, polyvinyl alcohol, polyvinylbutyral, polyvinyl pyrrolidine and polyvinyl oxazolidinone. Especially preferred are amorphous rubbery copolymers of such polymers with olefins. Particularly preferred examples of such copolymers include ethylene vinylacetate, ethylene butylacrylate and ethylenemethylacrylate. The homopolymers and copolymers comprising oxygen-containing pendant groups are considered to provide adhesion to the tire crumb as a result of affinity between the oxygen-containing pendant groups and polar sites on the vulcanized rubber polymer.

Particularly preferred is amorphous rubbery ethylenevinyl acetate copolymer that comprises about 5 to about 60 weight percent vinyl acetate based on the total weight of the copolymer more preferably about 10 to about 40 percent by weight vinylacetate and still more preferably about 20 to 40 weight percent vinylacetate.

The compositions of the invention may if desired be pre-melted together, for example in a conventional internal mixer at a temperature of about 275° F. to 400° F. sufficient to melt the vinyl polymer, polyolefin, and uncured rubber and form the mixture into a uniform blend. The blend may then be divided into particulate form, for example by pelletization or the like, in conventional manner, to provide pellets or other particles that may be used in conventional thermoplastic elastomer molding applications. Alternatively, the blend of polymers and tire crumb in finely divided form may be simply pre-mixed to provide a dry uniform mixture that may be used directly as the feed to a molding process. For example, such dry mixture may be used as the feed for a conventional screw extruder operating at a temperature typically in the range 275° F. under conditions adequate to melt the fusible components of the polymer mixture and provide a molded polymer product in conventional manner.

The composition may comprise small qualities of conventional processing aids, such as plasticizers, lubricants, mould release agents and the like. For example, it may comprise small quantities, typically less than about 10% and more typically less than about 5% by weight based on the total weight of the polymer of processing oils, such as SUNPAR 110 paraffinic oil, conventional antioxidants, such as TMB. The composition may comprise conventional mold lubricants, such as stearic acid. Further, the composition may comprise a conventional reodorant, such as vanillin or pine oil, in order to mask the somewhat sulphurous smell of the tire crumb component.

The compositions of the invention are black, thermoplastic, general purpose elastomers with good fluid resistance, that can be used to replace thermoset rubbers in a variety of applications. The thermoplastic elastomer compositions of the invention can be processed using standard injection molding, extrusion and other melt processing techniques. The material contains significant quantities of recycled rubber from scrap passenger car tires, and may contain recycled plastic materials from post-industrial or post-consumer waste streams.

An advantage of the present compositions is that many of the major components may be derived from post industrial and post consumer waste streams, thus providing benefits of disposal of waste materials as well as taking advantage of the ready availability and lower cost of such materials. In most localities, polyethylene, polypropylene, ethylene vinylacetate copolymer and uncured rubber are readily available from waste streams.

While the above description provides ample information to one of ordinary skill in the art to make and use the compositions of the invention, for the avoidance of doubt some detailed Examples will be given.

EXAMPLES

All percentages or parts by weight herein are by weight based on the total weight of the composition.

Example 1

The composition set out in Table 1 below was blended in an internal mixer at a temperature of 350° F. for a period of about 5 minutes sufficient to melt the fusible ingredients and form a uniform blend.

TABLE 1

| | |
|---|---|
| Micron tire crumb | 51% |
| Polyethylene | 16% |
| Polypropylene | 8% |
| EVA | 12% |
| SBS co-polymer | 12% |
| Antioxidant | 1% |

For testing purposes, plaques were injection molded from the blended composition, and were tested and values obtained in accordance with the procedures indicated in Table 2 below.

TABLE 2

| PROPERTY | TEST METHOD | TEST UNITS | TYPICAL VALUE |
|---|---|---|---|
| Tire crumb component | | % | 51 |
| Hardness | ASTM-D-2240 | Shore 'A' | 77 |
| Specific Gravity | ASTM-D-792 | | 1.04 |
| Tensile strength, ultimate* | ASTM-D-412 | MPa | 5.20 |
| Elongation, ultimate* | ASTM-D-412 | % | 260 |

TABLE 2-continued

| PROPERTY | TEST METHOD | TEST UNITS | TYPICAL VALUE |
|---|---|---|---|
| 100% modulus* | ASTM-D-412 | MPa | 3.5 |
| Compression set, 168 hrs | ASTM-D-395, Method "B" | % at 23° C. | 60 |
| Tear strength | ASTM-D-624 | kN/M @ 23° C. | 32 |
| Brittle point | ASTM-D-746 | ° C. | <−40° C. |
| Ozone resistance | BP-101-1 | Cracks | 0 |
| Flammability | SAE J369 | Mm/Min | 25 |

*Properties measured across the flow.

Example 2

The procedure of Example 1 was followed except the composition was as indicated in Table 3 below.

The physical properties were tested and evaluated, and were as indicated in Table 4 below.

TABLE 3

| Formulation | | Parts by weight |
|---|---|---|
| Tire Crumb 40 micron | (1) | 52.0 |
| 2035 Polyethylene | (2) | 18.4 |
| Polypropylene pm 6100 | (3) | 7.0 |
| Sunpar 110 | (4) | 4.4 |
| Kraton 1102 | (5) | 8.6 |
| EVA 2510M | (6) | 8.6 |
| TMB6 | (7) | 1.0 |
| stearic acid | (8) | 0.5 |
| Vanillin | (9) | 0.1 |
| total | | 100.6 |

Notes
(1) Ground passenger car tire crumb. Average particle size 40 mesh or 425 microns.
(2) ex Dow Chemical Canada Inc., Sarnia, Ontario, Canada
(3) Montell Canada Inc., Mississauga, Ontario
(4) ex Suncor Inc. Calgary, Alberta, Canada. Paraffinic oil processing aid.
(5) styrene-butadiene-styrene block copolymer ex Shell Canada Limited, Calgary, Alberta.
(6) ethylene vinyl acetate copolymer ex A.T. Plastics Inc., Brampton, Ontario.
(7) antioxidant ex Great Lakes Chemical Corporation, West Lafayette, IN.
(8) processing aid.
(9) reodorant.

TABLE 4

| Physicals | |
|---|---|
| Tensile strength MPa | 7.2 |
| Elongation % | 200 |
| Hardness Shore A | 89 |
| Compression set | 75 |
| 100% mod. MPa | 5.3 |
| Tear kN/m | 52 |
| Density | 1.01 |
| Low Temp. flexibility | −40 C. |
| Ozone resistance/Bp101-01 | 0 |
| flammability/SAE J369 mm/min | 75 |
| heat aged 168 hrs, 70° C. | |
| change in hardness points | +1 |
| change in tensile % | +10 |
| change in elongation % | −25 |
| heat aged 1000 hrs, 70° C. | |
| change in hardness points | +3 |
| change in tensile % | +3 |
| change in elongation % | −30 |

Example 3

The procedure of Example 1 was followed except the composition was as indicated in Table 5 below.

The product had physical properties at least equivalent to those of the product of Examples 1 and 2.

TABLE 5

| Formulation: | | Parts by weight |
|---|---|---|
| Micron 40 | (1) | 51 |
| LLDPE Ga 56400 | (2) | 18 |
| PolyPropylene SB 787 | (3) | 12 |
| EVA 2803 M | (4) | 7 |
| Kraton D1101 | (5) | 6 |
| Sunpar 2280 | (6) | 3 |
| Pine oil | (7) | 0.1 |
| Naugawhite | (8) | 1 |
| Deoflow 821 | (9) | 2 |

Notes
(1) Ground passenger car tire crumb. Average particle size 40 mesh or 425 microns.
(2) Linear low density polyethylene ex Equistar Chemical LP, Texas 77253-33646.
(3) ex Montell Canada Inc., Mississauga, Ontario
(4) ethylene vinyl acetate copolymer ex A.T. Plastics Inc., Brampton, Ontario.
(5) Styrene-butadiene-styrene block copolymer ex Shell Canada Calgary, Alberta.
(6) paraffinic oil processing aid ex Suncor Inc., Calgary, Alberta
(7) reodorant.
(8) antioxidant ex Uniroyal Chemical Ltd., Elmira, Ontario.
(9) soap-like processing aid ex H. L. Blachford Ltd., Mississauga, Ontario.

Comparative Testing

In order to illustrate the combined effect of the vinylpolymer (ethylenevinyl acetate copolymer) and uncured rubber (styrene-butadiene-styrene block copolymer) on the compositions of the invention, four compositions A, B, C and D were mixed, blended, molded and tested as described in more detail in Example 1 above. Formulation D is in accordance with the invention. The compositions, and the tensile strengths, elongations, tear strength, hardness and viscosity values are given (in the units of and by the test methods of Table 2), together with the particulars of the compositions, in Table 6 below.

TABLE 6

| | (Parts by weight) | | | |
|---|---|---|---|---|
| Formulations | A | B | C | D |
| tc | 50 | 50 | 50 | 50 |
| pe | 36 | 28 | 28 | 22 |
| pp | 14 | 12 | 12 | 8 |
| eva | | 10 | | 10 |
| 1102 | | | 10 | 10 |
| Tensile | 5.9 | 5.6 | 5.7 | 7.2 |
| elongation | 24 | 133 | 56 | 207 |
| Tear | 24 | 20.3 | 30.5 | 52.2 |
| hardness | 97 | 91 | 92 | 91 |
| Viscosity | 3.2 | 2.7 | 3.5 | 4.7 |

Notes:
tc tire crumb
pe polyethylene
pp polypropylene
eva ethylene vinyl acetate copolymer
1102 styrene-butadiene-styrene block copolymer The synergistic effect of the combination of the vinyl polymer and uncured rubber on the elongation and tear strength is particularly marked.

Insofar as component (c), the uncured rubber or styrene-based thermoplastic elastomer component of the compositions of the invention, may be a vinyl copolymer, components (c) and (d) may in some compositions of the invention be the same polymer. In such case the percentages required for components (c) and (d) in the following claims are additive, that is to say the compositions contain about 2 to about 30% of the polymer that is an uncured rubber or styrene-based thermoplastic elastomer plus about 2 to about 30% of the polymer that is a vinyl copolymer, or about 4% to about 60% of the polymer in total.

What is claimed is:

1. A thermoplastic elastomer composition comprising a blend of the following components:
   (a) about 5% to about 90% vulcanized rubber crumb;
   (b) about 5% to about 60% polyolefin comprising polyethylene and polypropylene in a weight ratio of about 1.5:1 to about 3:1;
   (c) about 2% to about 30% styrenic block copolymer or uncured rubber selected from the group consisting of natural rubber, styrene-butadiene rubber, polybutadiene, polyisoprene, polyisobutylene, isoprene-butadiene copolymer, neoprene, nitrile rubber, butyl rubber, polysulfide elastomer, acrylic elastomer, silicone rubber, polyester rubber, diisocyanate-linked condensation elastomer, EP DM (ethylene-propylene diene rubbers), EPT (ethylene-propylene terpolymer rubbers), and mixtures thereof; and
   (d) about 2% to about 30% vinyl acetate polymer selected from the group consisting of homopolymers and copolymers of vinyl acetate and mixtures thereof;
   and with the proviso that when said component (c) comprises styrenic block copolymer said composition contains in total less than 15% styrenic block copolymer; all said percentages by weight based on the total weight of the composition.

2. A composition according to claim 1 wherein the content of vulcanized rubber crumb (a) is about 25% to about 75%.

3. A composition according to claim 2 wherein said content is about 40% to about 60%.

4. A composition according to claim 1 wherein said vulcanized rubber crumb (a) has its particle size in the range about 20 to about 100 mesh.

5. A composition according to claim 1 wherein the content of polyolefin (b) is about 10% to about 40%.

6. A composition according to claim 5 wherein said content is about 20% to about 30%.

7. A composition according to 1 wherein said of polyethylene to polypropylene is about 1.8:1 to about 2.8:1.

8. A composition according to claim 1 wherein the content of styrenic block copolymer or uncured rubber (c) is about 4% to about 20%.

9. A composition according to claim 8 wherein said content is about 5% to about 15%.

10. A composition according to claim 1 wherein said styrenic block copolymer is styrene-butadiene-styrene, styrene-(ethylene/butylene)-styrene, styrene-(ethylene/propylene)-styrene, styrene-isoprene-styrene or mixtures thereof.

11. A composition according to claim 1 containing in total about 2 to about 14% styrenic block copolymer.

12. A composition according to claim 11 containing in total about 6 to about 12% styrenic block copolymer.

13. A composition according to claim 1 wherein the content of vinyl acetate polymer (d) is about 4% to about 20%.

14. A composition according to claim 13 wherein said content is about 5% to about 15%.

15. A composition according to claim 1 wherein said vinyl acetate polymer (d) comprises an amorphous rubbery copolymer.

16. A composition according to claim 1 wherein said vinyl acetate polymer (d) comprises ethylene vinylacetate copolymer.

17. A composition according to claim 16 wherein said copolymer comprises a vinyl acetate content of about 5 to about 60% by weight based on the total weight of the ethylene vinylacetate copolymer.

18. A composition according to claim 17 wherein said vinyl acetate content is about 10 to about 40%.

19. A composition according to claim 18 wherein said content is about 20 to about 40%.

20. A thermoplastic elastomer composition comprising a blend of the following components:

(a) about 5% to about 90% vulcanized rubber crumb;

(b) about 5% to about 60% polyolefin consisting essentially of one or more homopolymers or copolymers formed substantially wholly of aliphatic hydrocarbon-monomers containing one ethylenically unsaturated group;

(c) about 2% to about 30% styrenic block copolymer or uncured rubber selected from the group consisting of natural rubber, styrene-butadiene rubber, polybutadiene, polyisoprene, polyisobutylene, isoprene-butadiene copolymer, neoprene, nitrile rubber, butyl rubber, polysulfide elastomer, acrylic elastomer, silicone rubber, polyester rubber, diisocyanate-linked condensation elastomer, EP DM (ethylene-propylene diene rubbers), EPT (ethylene-propylene terpolymer rubbers), and mixtures thereof; and (d) about 2% to about 30% vinyl acetate polymer selected from the group consisting of homopolymers and copolymers of vinyl acetate and mixtures thereof;

and with the proviso that said component (c) comprises styrenic block copolymer and said composition contains in total about 2% to about 14% styrenic block copolymer;

all said percentages by weight based on the total weight of the composition.

* * * * *